US009287993B1

(12) United States Patent
Adleman et al.

(10) Patent No.: US 9,287,993 B1
(45) Date of Patent: Mar. 15, 2016

(54) RF CHANNELIZER BASED ON PARAMETRICALLY GENERATED COMBS DERIVED FROM A SINGLE MASTER SEED

(71) Applicant: The United States of America as represented by the Secretary of the Navy, Washington, DC (US)

(72) Inventors: James R. Adleman, San Diego, CA (US); Christopher K. Huynh, San Diego, CA (US); Everett William Jacobs, San Diego, CA (US); Sanja Zlatanovic, San Diego, CA (US); Andreas O. J. Wiberg, La Jolla, CA (US); Stojan Radic, San Diego, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 14/529,149

(22) Filed: Oct. 31, 2014

(51) Int. Cl.
*H04B 10/00* (2013.01)
*H04B 10/61* (2013.01)
*H04B 10/2575* (2013.01)
*H04J 14/02* (2006.01)

(52) U.S. Cl.
CPC .......... *H04B 10/616* (2013.01); *H04B 10/2575* (2013.01); *H04J 14/0298* (2013.01); *H04B 2210/006* (2013.01)

(58) Field of Classification Search
CPC .......... H04B 10/2575–10/2587; H04J 14/0298
USPC ...................... 398/115–117, 76–89, 182, 183
See application file for complete search history.

(56) References Cited

U.S. PATENT DOCUMENTS

| | | | | |
|---|---|---|---|---|
| 7,315,697 B2 * | 1/2008 | Smilanski | .......... | H04B 10/2543 398/183 |
| 8,447,155 B1 * | 5/2013 | Kuo | ........................ | G02F 1/353 385/1 |
| 8,451,528 B1 * | 5/2013 | Kuo | .......................... | G02F 1/07 359/264 |

(Continued)

OTHER PUBLICATIONS

Wiberg et al.; "Coherent Filterless Wideband Microwave/Millimeter—Wave Channelizer Based on Broadband Parametric Mixers"; Journal of Lightwave Technology, vol. 32, No. 20, Oct. 15, 2014.

(Continued)

*Primary Examiner* — Li Liu
(74) *Attorney, Agent, or Firm* — SPAWAR Systems Center Pacific; Kyle Eppele; J. Eric Anderson

(57) ABSTRACT

An RF channelizer comprising: a master laser for generating a reference beam; a splitter for splitting the reference beam into first and second beams; first and second modulator modules for converting the first and second beams into first and second modulated beams; first and second seed tone generators for deriving first and second seed tones; first and second parametric mixers for converting the first and second seed tones into first and second combs; a signal modulator for modulating a received RF signal onto the first comb; first and second optical filters for separating the first and second combs into pluralities of first and second filtered beams with center frequencies corresponding to the second comb lines; and a coherent detection array for selecting, combining, and detecting corresponding pairs from first and second filtered beams providing at the output a contiguous bank of channelized signals covering the bandwidth of the RF signal.

20 Claims, 14 Drawing Sheets

(56) References Cited

U.S. PATENT DOCUMENTS

| | | | |
|---|---|---|---|
| 8,611,759 B1* | 12/2013 | Kvavle | H04J 14/02 398/115 |
| 2006/0002715 A1* | 1/2006 | Igarashi | G02F 1/3513 398/152 |
| 2013/0223459 A1* | 8/2013 | Radic | H01S 3/13 372/20 |
| 2014/0270783 A1* | 9/2014 | Prather | H04B 10/25752 398/115 |

OTHER PUBLICATIONS

Wiberg et al.; "Agile Wideband Microwave/Millimeter—wave Analysis by Coherent Filterless Channelizer"; presented as a post-deadline paper at MWP 2013 Conference, Oct. 31, 2013.

* cited by examiner

RF CHANNELIZER BASED ON PARAMETRICALLY GENERATED COMBS DERIVED FROM A SINGLE MASTER SEED

FEDERALLY-SPONSORED RESEARCH AND DEVELOPMENT

The United States Government has ownership rights in this invention. Licensing and technical inquiries may be directed to the Office of Research and Technical Applications, Space and Naval Warfare Systems Center, Pacific, Code 72120, San Diego, Calif., 92152; voice (619) 553-5118; ssc_pac_t2@navy.mil. Reference Navy Case Number 103391.

BACKGROUND OF THE INVENTION

Analysis of spectral content in microwave and millimeter-wave spectral ranges is of interest to applications such as detection of frequency hopping and spread spectrum signals. However, when analyzing extremely wideband signals covering bandwidths much greater than 10 GHz, achieving desired resolution, sensitivity, and speed using existing techniques is a challenge. Conventional radio frequency (RF) channelized receivers use a bank of filters to provide separate RF channels to the system backplane. This prior art approach poses a set of implementation and performance challenges, including unwanted noise due to amplification and splitting, alignment challenges of filters at a fine frequency pitch, and channel crosstalk.

SUMMARY

An embodiment of a radio frequency (RF) channelizer may be described as comprising: a master laser, a splitter, an RF reference oscillator, first and second modulator modules, first and second seed tone generators, first and second parametric mixers, first and second optical filters, and a coherent detection array. The master laser is configured to generate a reference beam at a reference frequency. The splitter is configured to split the reference beam into first and second beams. The first modulator module is configured to convert the first beam into a first modulated beam comprising a multitude of frequencies spaced from the reference frequency by integer multiples of a first RF frequency that is referenced to the RF reference oscillator. The second modulator module is configured to convert the second beam into a second modulated beam comprising a multitude of frequencies spaced from the reference frequency by integer multiples of a second RF frequency that is referenced to the RF reference oscillator. The first seed tone generator is configured to derive a first seed tone beam from the first modulated beam. The second seed tone generator is configured to derive a second seed tone beam from the second modulated beam. The first parametric mixer is configured to receive and convert the first seed tone beam into a first comb. The signal modulator is configured to modulate a received RF signal to be channelized onto the first comb. The second parametric mixer is configured to receive and convert the second seed tone beam into a second comb. The first optical filter is configured to receive and to separate the RF-signal-modulated first comb into a plurality of first filtered beams a center frequency of each first filtered beam corresponding to a frequency of an individual line of the second comb. The second optical filter is configured to receive and to separate the second comb into a plurality of second filtered beams each second filtered beam corresponding to an individual line of the second comb. The coherent detection array is configured to select and down-convert the received RF signal from the first and second filtered beams.

An embodiment of a radio frequency (RF) channelizer may be described as comprising: a master laser, a splitter, an RF reference oscillator, first and second modulator modules, first and second seed tone generators, first and second parametric mixers, first and second optical filters, and a coherent detection array. The master laser is configured to generate a reference beam at a reference frequency. The splitter is configured to split the reference beam into first and second beams. The first modulator module is configured to convert the first beam into a first modulated beam comprising a multitude of frequencies spaced from the reference frequency by integer multiples of a first RF frequency that is referenced to the RF reference oscillator. The second modulator module is configured to convert the second beam into a second modulated beam comprising a multitude of frequencies spaced from the reference frequency by integer multiples of a second RF frequency that is referenced to the RF reference oscillator. The first seed tone generator is configured to derive at least three seed beams from the first modulated beam, at least two seed beams with high optical power with frequency spaced by $2\Delta f_P$ and a given seed beam with frequency offset by $\Delta f_P/2$ from one of the other seed beams, where $\Delta f_P/2$ is equal to or a multiple of the first RF frequency. The signal modulator is configured to modulate a received RF signal to be channelized onto the given seed beam, wherein the first seed tone generator is further configured to filter and combine the at least three seed beams into a single first seed tone beam. The first parametric mixer is configured to receive and convert the first seed tone beam into a first comb comprising a comb of lines spaced by $2\Delta f_P$ and multicasted copies of the modulated given seed beam with spacing $\Delta f_P$ and offset in frequency by $\Delta f_P/2$ from the comb of lines spaced by $2\Delta f_P$. The second seed tone generator is configured to derive from the second modulated beam a second seed tone beam comprising at least two second seed tones, spaced by $(\Delta f_P+\delta)/n$, where n is a positive integer and the absolute value of $\delta$ is the channel spacing, or resolution bandwith, of the channelizer, and where $(\Delta f_P+\delta)/n$ is a multiple of the second RF frequency. The second parametric mixer is configured to receive and convert the second seed tone beam into a second comb with frequency pitch $(\Delta f_P+\delta)/n$. The first optical filter is configured to receive and separate the first comb into a plurality of first filtered beams, the center frequency of each first filtered beam corresponding to a frequency of an individual line of the second comb. The second optical filter is configured to receive and separate the second comb into a plurality of second filtered beams, each second filtered beam corresponding to an individual line of the second comb. The coherent detection array is configured to select, combine, and detect corresponding pairs from the first filtered beams and the second filtered beams. The coherent detection array is further configured to provide as an output a contiguous bank of channelized coherent I/Q down-converted intermediate frequency (IF) signals, spaced in frequency by the absolute value of $\delta$ covering the bandwidth of the received RF signal.

The RF channelizer may be described as a method for channelizing a received RF signal comprising the following steps. The first step provides for generating a reference beam having a reference frequency. The next step provides for splitting the reference beam into first and second beams. The next step provides for converting the first beam into a first modulated beam comprising a multitude of frequencies spaced from the reference frequency by integer multiples of a first RF frequency that is referenced to the RF reference oscillator. The next step provides for converting the second beam into a second modulated beam comprising a multitude of frequencies spaced from the reference frequency by integer multiples of a second RF frequency that is referenced to the RF reference oscillator. The next step provides for deriving a first seed tone beam comprising two (or more) seed frequencies spaced by $\Delta f_P$, where $\Delta f_P$ is a multiple of the first RF frequency, from the first modulated beam. The next step provides for deriving a second seed tone beam comprising of two (or more) seed frequencies spaced by $(\Delta f_P+\delta)/n$ where $(\Delta f_P+\delta)/n$ is a multiple of the second RF frequency, from the second modulated beam. The next step provides for converting the first seed tone beam into a first comb with a first parametric mixer. The next step provides for modulating a received RF signal onto the first comb. The next step provides for converting the second seed beam into a second comb with a second parametric mixer. The next step provides for separating the RF-signal-modulated first comb into a plurality of first filtered beams, the center frequency of each first filtered beam corresponding to the frequency of an individual line of the second comb. The next step provides for separating the second comb into a plurality of second filtered beams each second filtered beam corresponding to an individual line of the second comb. The final step, coherent detection, provides for selecting, combining, and detecting corresponding pairs from first filtered beams and the second filtered beams, to provide at the output a contiguous bank of channelized coherent I/Q down converted intermediate frequency (IF) signals, spaced in frequency by the absolute value of $\delta$ covering the bandwidth of the received RF signal.

BRIEF DESCRIPTION OF THE DRAWINGS

Throughout the several views, like elements are referenced using like references. The elements in the figures are not drawn to scale and some dimensions are exaggerated for clarity.

DETAILED DESCRIPTION OF EMBODIMENTS

Figure 1:
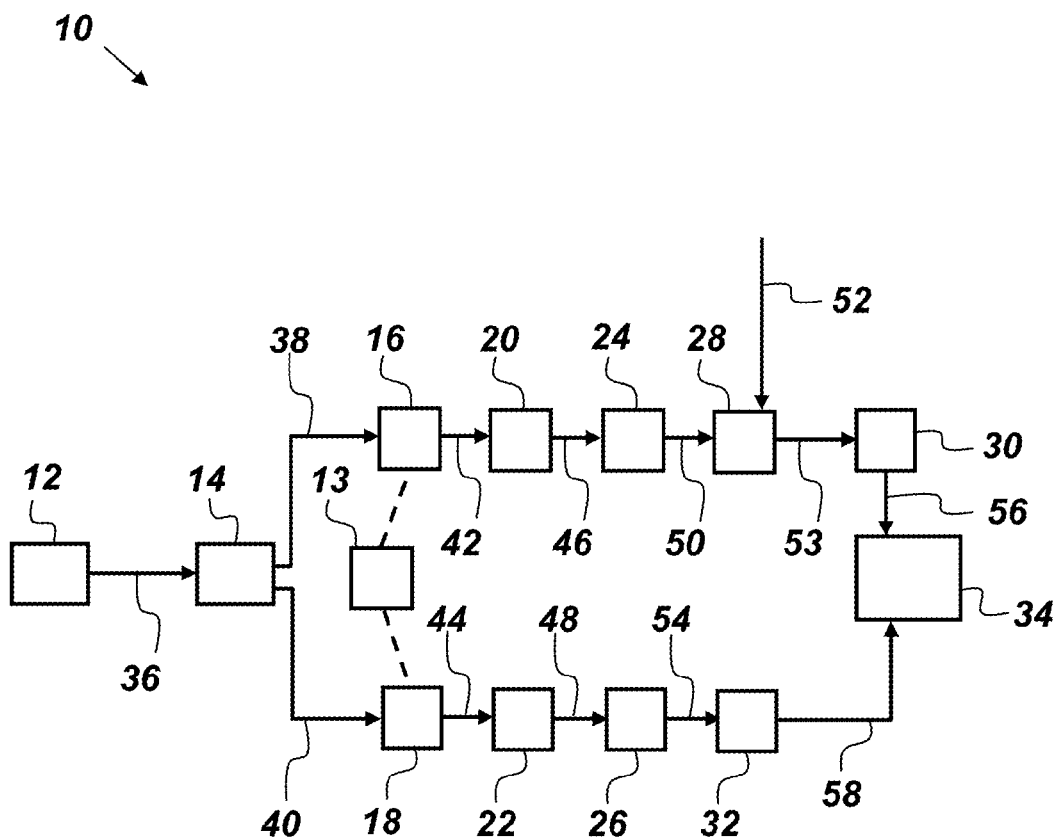
FIG. 1 is an illustration of an embodiment of an RF channelizer.

Listed below are acronyms and abbreviations used herein and in the drawings.
ADC analog to digital converter
AWG arrayed waveguide grating
BGD bragg grating demultiplexer,
COF configurable optical filter
CW continuous wave
DSP digital signal processing
EDFA Erbium Doped Fiber Amplifier
FFT fast Fourier transform
HNLF highly-nonlinear-fiber
IF intermediate frequency
IMD3 third-order inter modulation
LNA low-noise electrical amplifier
LO local oscillator
ML master laser
MZI Mach Zehnder Interferometer
MZM Mach-Zehnder modulator
O/E electro-optical
OP optical wavelength processor
OSNR optical signal-to-noise ratio
PC polarization controller
PD photodiode
PM phase modulator
PS RF phase shifter
RF radio frequency
SBS stimulated Brillouin scattering
SFDR spurious-free dynamic range
SL slave laser
SMF single mode fiber
SNR signal-to-noise ratio
WDM wavelength division multiplexer The radio frequency (RF) channelizer described herein divides the RF spectrum into narrower frequency bins, allowing for signal processing with increased resolution and provides staring analysis of extremely wideband signals. The disclosed methods and systems below may be described generally, as well as in terms of specific examples and/or specific embodiments. For instances where references are made to detailed examples and/or embodiments, it should be appreciated that any of the underlying principles described are not to be limited to a single embodiment, but may be expanded for use with any of the other methods and systems described herein as will be understood by one of ordinary skill in the art unless otherwise stated specifically.

FIG. 1 is an illustration of a comb modulation embodiment of an RF channelizer 10 comprising, consisting of, or consisting essentially of a master laser 12, an RF reference oscillator 13, a splitter 14, a first modulator module 16, a second modulator module 18, a first seed tone generator 20, a second seed tone generator 22, a first parametric mixer 24, a second parametric mixer 26, a signal modulator 28, a first optical filter 30, a second optical filter 32, and a coherent detection array 34. The master laser 12 is configured to generate a reference beam 36 at a reference frequency. The splitter 14 is configured to split the reference beam 36 into a first beam 38 and a second beam 40. The first modulator module 16 is configured to receive and convert the first beam 38 into a first modulated beam 42. The first modulated beam 42 comprises a multitude of frequencies that are spaced from the reference frequency by integer multiples of a first RF frequency that is referenced to the RF reference oscillator 13. The second modulator module 18 is configured to convert the second beam into a second modulated beam 44, which comprises a multitude of frequencies spaced from the reference frequency by integer multiples of a second RF frequency that is referenced to the RF reference oscillator 13. The first seed tone generator 20 is configured to derive from the first modulated beam 42 a first seed tone beam 46 comprising at least two first seed frequencies spaced by $\Delta f_P$ where $\Delta f_P$ is a multiple of the first RF frequency. The second seed tone generator 22 is configured to derive from the second modulated beam 44, a second seed tone beam 48 comprising at least two second seed tones, spaced by $(\Delta f_P+\delta)/n$, where n is a positive integer and the absolute value of $\delta$ is the channel spacing (i.e., resolution bandwidth) of the channelizer, and where $(\Delta f_P+\delta)/n$ is a multiple of the second RF frequency. The first parametric mixer 24 is configured to receive and convert the first seed tone beam 46 into a first comb 50 with frequency pitch $\Delta f_P$. The signal modulator 28 is configured to modulate the received RF signal 52 onto the first comb 50 to produce an RF-signal-modulated comb 53. The second parametric mixer 26 is configured to receive and convert the second seed tone beam 48 into a second comb 54 with frequency pitch $(\Delta f_P+\delta)/n$. The first optical filter 30 is configured to separate the RF-signal-modulated comb 53 into a plurality of first filtered beams 56, the center frequency of each first filtered beam 56 corresponding to the frequency of an individual line of the second comb 54. The second optical filter 32 is configured to separate the second comb 54 into a plurality of second filtered beams 58 each second filtered beam 58 corresponding to an individual line of the second comb 54. The coherent detection array 34 is configured to select, combine, and detect corresponding pairs from the first filtered beams 56 and the second filtered beams 58, providing at its output a contiguous bank of channelized coherent I/Q down-converted intermediate frequency (IF) signals, spaced in frequency by the absolute value of $\delta$ covering the bandwidth of the received RF signal 52.

The master laser 12 may be chosen to be an narrow linewidth coherent optical source capable of producing the reference beam 36 at a reference frequency. Suitable examples of the master laser 12 include, but are not limited to, an external cavity semiconductor laser or a fiber laser with linewidth less than 10 kHz. For example, in one embodiment, the master laser 12 may be a single narrow-line-width external-cavity distributed feedback laser diode with frequency centered at 193.50 THz. The splitter 14 may be any device capable of splitting the reference beam 36 into two beams (i.e., the first and second beams 38 and 40) that share the same reference frequency as the reference beam 36. One example of the splitter 14 is a fused fiber coupler/splitter.

The first and second modulator modules 16 and 18 may each be any device or combination of devices capable of converting a received beam into a modulated beam comprising a multitude of frequencies spaced from the frequency of the received beam by integer multiples of an RF drive frequency such as the first and second RF frequencies mentioned above. Suitable examples of modulator modules that may be used for the first and second modulator modules 16 and 18 include, but are not limited to, electro optic phase modulators, intensity modulators, or a combination/cascade of electro optic phase and intensity modulators driven by an RF drive signal referenced to the RF reference oscillator 13, that is delivered to the electro optic modulators via RF splitters, RF amplifiers, and RF delays. In one embodiment the first modulator module 16 may be a fiber pigtailed lithium niobate electro optic phase modulator driven by an amplified RF drive signal referenced to the RF reference oscillator 13.

The first and second seed tone generators 20 and 22 respectively may be any device or group of devices capable of producing a beam comprised of selected and amplified desired tone frequencies from the modulated beam, where unwanted tones are significantly attenuated or removed. A suitable example would be a cascade of optical filter stages, passing only desired seed tones, followed by optical amplification to increase the power of the seed tones, followed by optical multiplexing and narrow band filtering to recombine seed tones into a single beam and limit broadband noise produced by the amplifier. Examples of filters used for the seed tone generators 20 and 22 may include thin film wavelength demultiplexer filters, arrayed waveguide gratings, fiber Bragg gratings with optical circulators, or wavelength selective switches. Example amplification stages may include erbium doped fiber amplifiers (EDFAs) or semiconductor optical amplifiers. In one embodiment of the RF channelizer 10, the first seed tone generator 20 may be, but is not limited to, a cascade of a pair of optical circulators with transmission ports connected to reflective fiber Bragg gratings at 193.4 and 193.6 THz respectively, and whose reflection ports are connected to optical amplification stages. In the aforementioned embodiment of the first seed tone generator 20, amplification stages may be implemented as an injection locked laser module tuned to the selected wavelength providing narrowband gain at the selected wavelength, followed by an EDFA to create a high power amplified seed tone at around 1 watt of optical power. The output of each amplification stage may be filtered with narrow band fiber Bragg gratings to remove broadband optical noise generated by optical amplification, and then multiplexed together onto a common beam using a wavelength division multiplexer (WDM) filter array to create the output beam from the seed tone generator. The second seed tone generator 22 may be embodied in the same manner selecting seed tones at 193.475 THz and 193.525 THz.

The first and second parametric mixers 24 and 26 may each be composed of optical waveguides having specific optical nonlinearity and dispersion properties. Each of the first and second parametric mixers 24 and 26 may be designed with a heterogeneous (multi-section) architecture supporting creation of optical shock waves, enhancing the efficiency of the nonlinear mixing. An example of such a mixer could be composed of cascaded sections of heterogeneous waveguides with lengths chosen to balance the effects of the nonlinear chirping due to self-phase modulation and linear compression due to dispersion. Example waveguides used for nonlinear mixing include high index contrast silica single mode optical fiber (i.e., highly nonlinear fiber (HNLF)), chalcogenide fibers, small mode area Silicon Nitride, Silicon, or chalcogenide integrated optical waveguides. Example waveguides used for linear compression include single mode silica fibers and larger mode area (dilute) integrated optical waveguides. In a specific embodiment of the first and second parametric mixers 24 and 26, each mixer is implemented with two HNLF stages and one standard single-mode-fiber (SMF) stage. The first stage of each mixer may consist of a length of HNLF that was longitudinally strained to increase the Brillouin threshold beyond that of the continuous wave (CW) pump level of the seed tones. The second state, the compression stage of each mixer may consist of standard SMF matching the frequency chirp induced in the first stage producing optical shock wave with high peak power. The third stage, where substantial mixing generating a wide spectral comb occurs, may consist of a length of dispersion-flattened HNLF possessing small normal dispersion which increases comb bandwidth and reduces noise due to parametric fluorescence.

The first and second optical filters 30 and 32 may each be any WDM de-multiplexer device with channel passbands centered at the wavelengths of the second comb. The first and second optical filters 30 and 32 may each be composed of any set of optical devices such as filters and splitters connected in such a manner to form a WDM de-multiplexor device. An example of a WDM de-multiplexer is an arrayed waveguide grating (AWG). An example of an AWG is a fiber pigtailed planar lightwave circuit AWG. Another example of a WDM de-multiplexer is a fiber pigtailed thin film filter based WDM de-multiplexer.

The signal modulator 28 in the comb modulation embodiment of the RF channelizer 10 may be an electro optic phase modulator. An example of an electro optic phase modulator is a fiber pigtailed lithium niobate electro optic phase modulator. The signal modulator 28 in the multicasting embodiment of the RF channelizer 10 may be an electro optic phase modulator or an electro optic intensity modulator. An example of an electro optic intensity modulator is a fiber pigtailed lithium niobate electro optic Mach Zehnder Interferometer (MZI) where the MZI is biased at its quadrature point. Another example of an electro optic intensity modulator is a fiber pigtailed lithium niobate electro optic MZI where the MZI is biased at its null point.

Suitable examples of the coherent detection array 34 include, but are not limited to, an array of optical hybrids, array of balanced photodetectors, array of RF filters, array of RF amplifiers, and array of analog-to-digital converters from which the signal is sent to digital signal processing system for further analysis. Optical hybrid may be any device capable of mixing two optical beams and producing optical outputs, each output having a different phase delay on one of the beams. An example would be a device that produces four outputs from two input beams by splitting each beam into four paths such that one of the beams has a different phase delay (for example 0, $\pi$, $\pi/2$, $-\pi/2$) in each path. Balanced photodetectors may be comprised of pairs of any photodetectors, examples of which may include, but are not limited to, PIN photodiodes, avalanche photodiodes, photoresistors, phototransistors followed by a balanced photodetector electrical circuit. Examples of an RF amplifier may include linear amplifiers and logarithmic amplifiers. In one embodiment, an array of optical hybrids is connected to an array of photodetectors by connecting two outputs from an optical hybrid (0, $\pi$) to one balanced photodetector, and the other two outputs ($\pi/2$, $-\pi/2$) to another balanced photodetector. The signals from the balanced photodetectors may be filtered using RF filters, amplified using linear RF amplifiers and sent to analog-to-digital converters. In another embodiment, the optical hybrids have two outputs (0, $\pi$), an example being a fused fiber coupler. The array of optical hybrids may be connected to an array of photodetectors by connecting two outputs from the optical hybrid (0, $\pi$) connected to an array of photodetectors by connecting two outputs from the optical hybrid (0, $\pi$) to one balanced photodetector. The signals from the balanced photodetectors may be filtered using RF filters, amplified using logarithmic RF amplifiers and sent to analog-to-digital converters.

Shifting in frequency the second comb with respect the first comb is a method that can be used to improve the operation of the RF channelizer 10 by improving the spectral efficiency of the channelizer. An example of a method to shift the second comb with respect to the first comb is to shift the second comb using an optional acousto-optic modulator driven by a third RF frequency referenced to the RF reference oscillator 13. The acousto-optic modulator may be positioned between the second seed tone beam 48 and the second parametric mixer 26 in FIG. 1. The acousto-optic modulator receives the second seed tone beam 48, and the frequency shifted output of the acousto-optic modulator is launched into second parametric mixer 26. For example, an implementation where the third RF frequency is $\delta/2$ and the second seed tone generator 22 is configured to derive from the second modulated beam 44 a second seed tone beam 48 comprising at least two second seed tones, spaced by $(\Delta f_P + 2\delta)/n$ where $(\Delta f_P + 2\delta)/n$ is a multiple of the second RF frequency, provides for channelizing unique RF frequencies from the lower and upper side bands of the comb of signal copies which have double side bands, therefore reducing the number of signal copies required to channelize the full RF bandwidth of the received RF signal 52.

Shifting the second comb 54 with respect the first comb 50 can be implemented using devices other than an acousto-optic modulator and by placing said devices in a position other than between the second seed tone beam 48 and the second parametric mixer 26 in FIG. 1. Shifting the second comb 54 with respect the first comb 50 can be used as a method to shift the RF frequencies that are channelized by the RF channelizer 10. For example, offsetting the second comb 54 with respect the first comb 50 can be implemented using a single-sideband electro optic modulator driven by the third RF frequency that is positioned between splitter 14 and second modulator module 18 in FIG. 1.

Figure 2A:
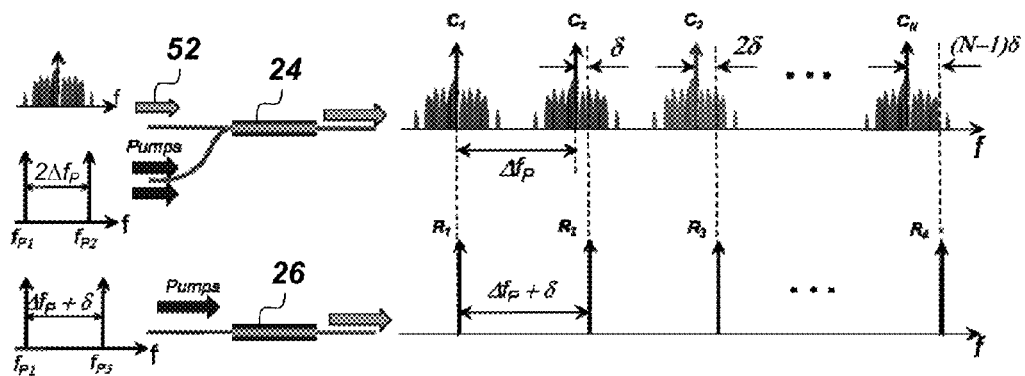
FIGS. 2a-2b are illustrations showing a process used by an RF channelizer for coherent channel replication and sub-band extraction.
Figure 2B:
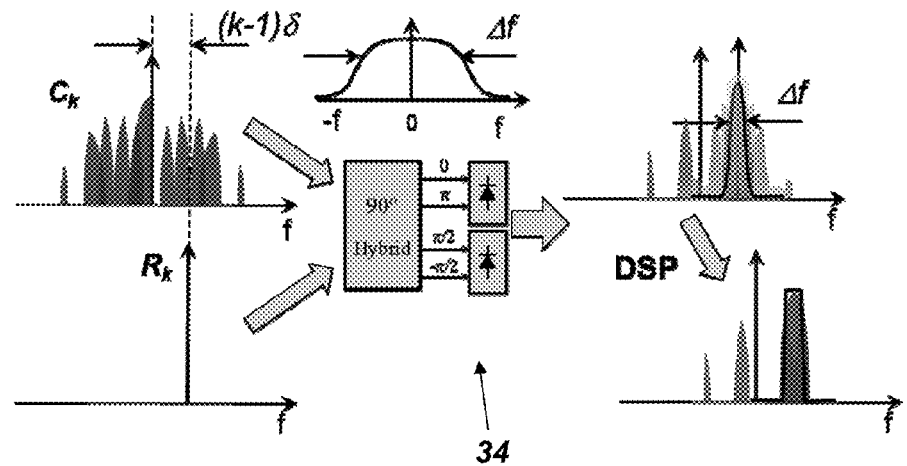

FIGS. 2a-2b are an illustration of the process used by the RF channelizer 10 for coherent channel replication and sub-band extraction. In the multicasting embodiment of the RF channelizer 10, the received RF signal 52 is modulated on an optical carrier, combined with pumps separated by $2\Delta f_P$ and offset from the optical carrier. The combined seed tone beam is connected to the first parametric mixer 24, which replicates (multicasts) the optical carrier modulated by the received RF signal 52 to a $\Delta f_P$-pitched frequency grid ($C_{1-N}$), where $C_1$ is a first signal copy and N is an index. The second parametric mixer 26 generates the reference frequency comb ($R_{1-N}$) with frequency pitch $\Delta f_P + \delta$. As a result, the reference tones experience a progressive (i.e., Vernier) frequency walk-off from the closest signal replica, as shown in FIG. 2a. Each tone of the reference frequency comb ($R_{1-N}$) acts as local oscillator (LO) for a specific signal sub-band. The alignment between the first signal copy ($C_1$) and the first reference comb tone ($R_1$) guarantees that the center of the k-th signal replica ($C_k$) will be shifted by $(k-1)\times\delta$ with respect to the nearest reference tone ($R_k$). The architecture derives all optical waves from a single high coherent optical source (i.e., the master laser 12).

As such, all sub-bands of the original channel are being addressed by a set of self-referenced LOs. When combined in a coherent receiver in the coherent detection array 34, the k-th reference tone will beat with the portion of the signal replica in its immediate spectral vicinity, a sub-band centered at $(k-1)\delta$ away from the carrier, as illustrated in FIG. 2b. The receiver passband may be set to equal the channel spacing $\delta$ by the analog bandwidth of photodiodes and following electronics. Digitization of both I and Q quadratures allow for measurement of the full frequency space, i.e., positive and negative frequencies relative to LO tone frequencies. After digitization, digital signal processing (DSP) may be applied to achieve, for instance, a boxcar filter response. The sub-rate detector response acts as an electrical bandpass filter and rejects the spectral content that is distant from the LO. This approach eliminates the need for narrow, stabilized physical filters in the optical domain. By changing the pitch and offset of the multicast- and LO-combs, the channelizer spacing (i.e, resolution bandwidth) $\delta$ can be varied. By changing the common frequency offset of the combs, a different signal frequency sub-band can be analyzed without need for slow tuning or substitution of a physical filter bank.

Practical mixers possess operational bandwidth in excess of 20 THz, sufficient to generate more than 100 copies of a 100-GHz-wide signal. Consequently, a high-probability intercept can be initiated by initially programming the analyzer in a "stare-all" configuration to access the entire channel band. Once the sub-band of interest is identified, the RF channelizer 10 may then be reconfigured to provide higher resolution access. By digital processing of all adjacent spectral bins, a full time domain signal may be reconstructed from strictly referenced sub-channel data allowing wideband time-domain analysis without any physical change to the photonics front-end.

The RF channelizer 10 is configured to generate hi-fidelity signal copies and coherent LO combs, which simultaneously have sufficient power, spectral purity, frequency coverage, frequency stability, and frequency pitch tuning for an agile adaptation of coverage frequency range. The RF frequency range can extend far in to the mm-wave regime, i.e. beyond 100 GHz, which introduces large frequency pitch and large spectral bandwidth requirements on the technique for optical comb generation. The beating of two phase-locked CW tones in a synthesized, nonlinear, cavity-less mixer addresses the aforementioned requirements. The nonlinear mixer may be designed with a heterogeneous (multi-section) architecture supporting creation of the shock waves, thus enhancing the efficiency of the nonlinear beating. Such effect is achieved by balancing of the effects of the nonlinear chirping and linear compression. Moreover, parametric fluorescence can degrade the performance, but with proper dispersion engineering of the mixer stages it can be suppressed. This approach also allows for the ability to change the comb-pitch and offset between signal replication and LO combs.

Figure 3:
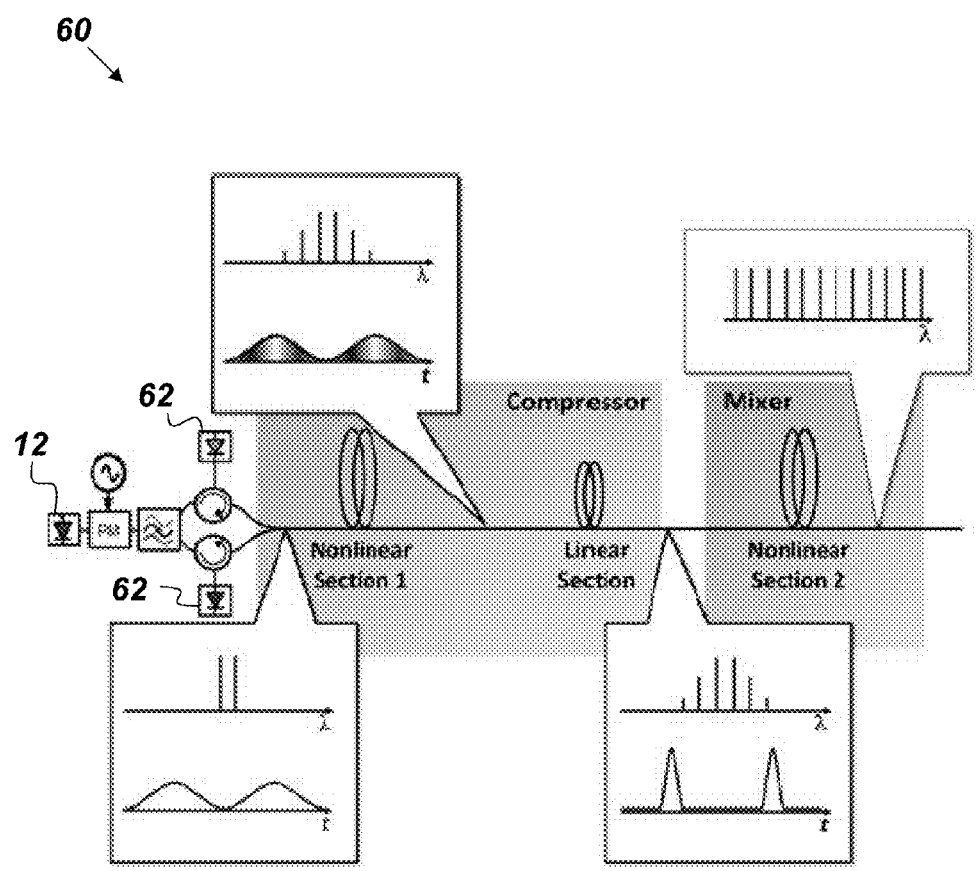
FIG. 3 is an illustration showing the principle of operation of a shock-wave mixer.

FIG. 3 is an illustration showing the principle of a shockwave mixer 60. Two CW-pumps 62 (or for example, first seed tone beam 46 or second seed tone beam 48) are first launched into the first nonlinear stage that induces chirping to the beating waveform. The second linear section having negative dispersion ($\beta_2 < 0$) eliminates the nonlinear chirp converting the original sinusoid into the train of the high power pulses (shock waves), thus significantly enhancing the nonlinear processes in the following nonlinear mixing stage. The shock waves receive significant self-phase modulation spectral broadening in the mixer made of dispersion-engineered HNLF and they generate multiple equidistant spectral tones synchronized in phase. The shockwave mixer design can also be modified to perform optical wavelength multicasting. Specifically, a signal seed can be multiplexed with the two strong pump waves that not only create a comb in a heterogeneous mixer, but also replicate this signal across the comb spectrum creating its multiple copies sitting at spectrally distinct carriers.

The use of multiple stages, not only enhances the four-wave mixing properties of the mixer, but also increases its Brillouin threshold through programmed fiber tension, thus increasing the allowed amount of launched power and, correspondingly, an increase of the power of the individual comb lines and multicasted copies. The temporal squeezing of the beating waveform accelerates a process of creation of the multiple tones that absorb the power from the original CW pumps 62, therefore suppressing back-propagating Brillouin waves. The properly engineered mixer reduces, if not eliminates, a need of spectral dithering previously required in order to suppress these parasitic waves. Dithering techniques preclude narrow, stable comb line generation, as well as, undistorted signal multicasting, as unavoidable frequency-to-amplitude modulation will deteriorate the signal integrity. The further increase of the stimulated Brillouin scattering (SBS) threshold can be achieved by introducing a specific tension map into nonlinear stages. This enables stable and high spectral purity comb generation.

The RF channelizer 10 relies on the fidelity of the generated comb-lines (copies) as well as the frequency locking between the two optical frequency combs that are used. If phase uncorrelated pump seeds are being used, the linewidth of the generated comb tones will progressively grow with line count, which is undesirable in this embodiment of the RF channelizer 10. However, the seed pumps can be correlated by using optical injection locking, by deriving injection locking seed tones from a single master laser 12, as depicted in FIG. 3. The use of high power slave lasers (SLs) such as the CW pumps 62, also provides means for improved power budget. Indeed, by using optical amplifiers operated in deep saturation, a close to ideal, low additive noise seeding of the shockwave mixer is realized. Moreover, the use of injection locking tones from a single master laser 12, is not limited to only one comb, but could also be shared by a second comb, with for instance a different pitch. The two combs will consequently be locked to each other by sharing the same master seed (i.e., reference beam 36).

Figure 4:
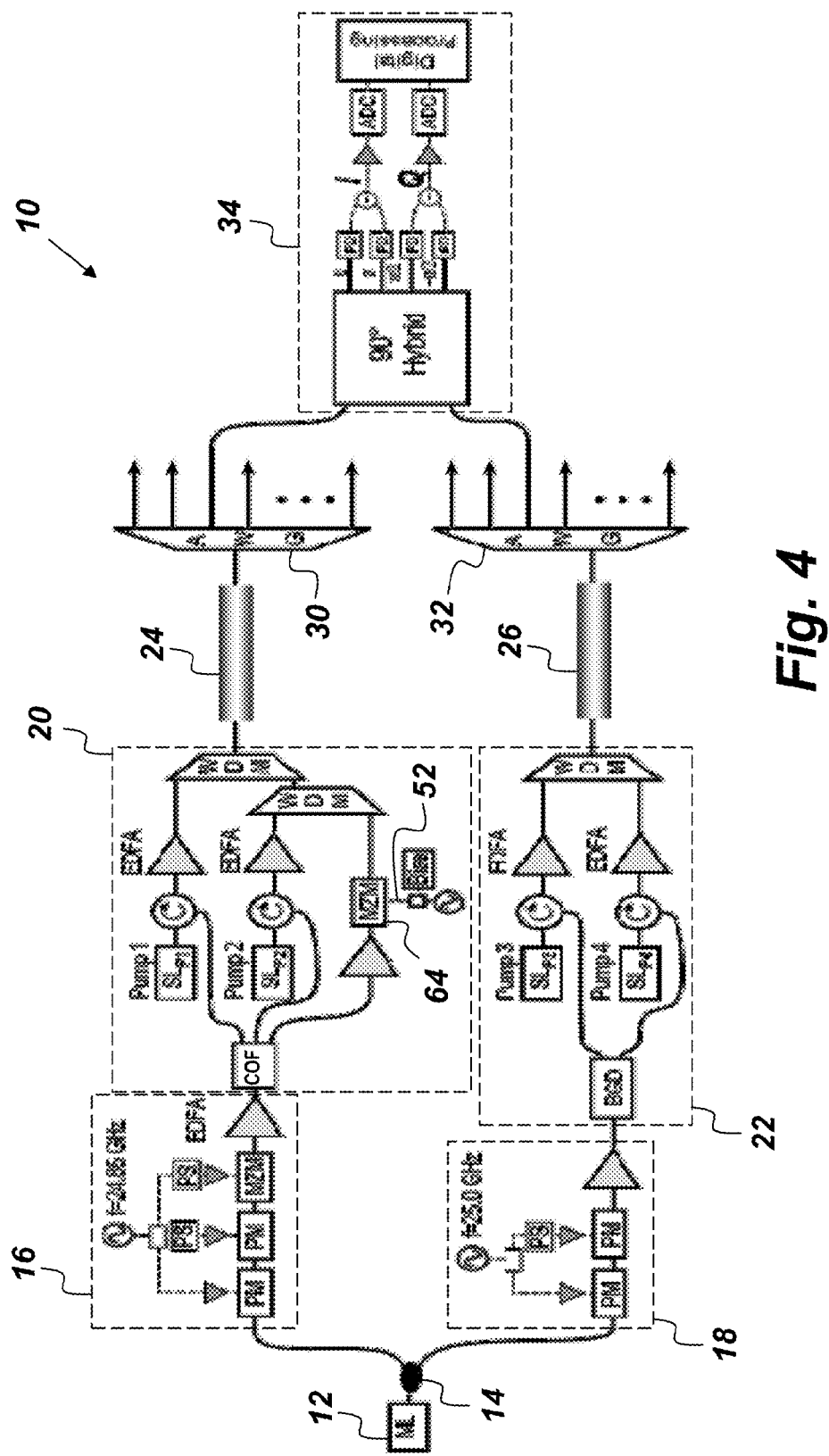
FIG. 4 is an illustration of an embodiment of an RF channelizer.

FIG. 4 is an illustration of an experimental set up of an embodiment of the RF channelizer 10 that used shockwave parametric mixers that enabled the creation of highly coherent frequency combs spanning the optical C and L bands, derived from standard telecommunication laser sources referenced to a single low phase noise CW laser. More specifically, the RF channelizer embodiment of FIG. 4 used parametric signal wavelength multicasting in first parametric mixer 24 to generate a multicasted signal comb, which was frequency locked to a shifted LO comb generated by second parametric mixer 26. In this embodiment, the first parametric mixer 24 was a shock-wave parametric mixer, such as the shockwave mixer 60, performing multicasting comb generation. The second parametric mixer 26 was a shock-wave parametric mixer, such as the shockwave mixer 60, performing local oscillator (LO) comb generation. Frequency locking of the combs was achieved by deriving the combs from a single reference beam 36 from the master laser 12 which was centered at 193.50 THz. More specifically, frequency locking of the combs was achieved by splitting the single reference beam 36 into two beams and deriving seed tone beams 46 and 48 locked to reference beam 36 using RF reference oscillator, modulator modules 16 and 18, and seed tone generators 20 and 22.

In the embodiment of the RF channelizer 10 shown in FIG. 4, the first modulator module 16 comprised two concatenated phase modulators (PMs) and a Mach-Zehnder modulator (MZM), which were used to generate a seed frequency comb (i.e., the first modulated beam 42, as shown in FIG. 1) with 24.85 GHz frequency pitch. In this embodiment of the first modulator module 16, a RF synthesizer was used to generate the appropriate frequency and was referenced by a 10 MHz reference signal. Subsequently, two comb lines with 397.6 GHz pitch (193.3012 and 193.6988 THz) were selected by the first seed tone generator 20 and used to injection lock two distributed-feedback high power SLs possessing 100 mW of output power, namely Pump 1 ($SL_{P1}$) and Pump 2 ($SL_{P2}$), respectively. This resulted in the creation of two frequency-referenced optical waves with no loss in the SL optical signal-to-noise ratio (OSNR). The new tones represent mixer pump seeds and may be generated at nearly arbitrary frequency spacing, limited only by one's ability to generate a sufficiently wide seed reference comb. The high power of the SLs resulted in small degradation of OSNR after being amplified with subsequent EDFAs and $ONSR_{0.1\,nm}$ of over 62 dB was retained. A third seed comb line was selected at 193.5994 THz, amplified with an EDFA, and modulated with the received RF signal 52. In this embodiment the received RF signal 52 was generated by an RF-synthesizer and was modulated onto the optical wave with a quadrature biased Mach-Zehnder modulator 64. The two injection locked pump SLs ($SL_{P1}$ and $SL_{P2}$) were amplified by high power EDFAs. The amplified signals $SL_{P1}$ and $SL_{P2}$ and the said third amplified seed comb line modulated with RF signal 52 where filtered and combined and launched in to the first parametric mixer 24.

Continuing with the description of the embodiment of the RF channelizer 10 shown in FIG. 4, the second modulator module 18 comprised two concatenated PMs used to generate a frequency comb (i.e., the second modulated beam 44, as shown in FIG. 1) with 25.0 GHz frequency pitch. In this embodiment of the second modulator module 18, an RF synthesizer was used to generate the appropriate frequency and was referenced by a 10 MHz reference signal. Similar to the first seed tone generator 20, for the pump seeds for the second parametric mixer 26, two comb lines were selected by the second seed tone generator 22 to attain 200 GHz spacing, at 193.425 and 193.625 THz, and subsequently used injection lock two distributed-feedback high power SLs possessing 100 mW of output power, namely Pump 3 ($SL_{P3}$) and Pump 4 ($SL_{P4}$), respectively. The amplified LO pump-seeds (Pump 3 and Pump 4) were amplified, with a maintained $ONSR_{0.1\,nm}$ of over 62 dB. The multicasting and LO-comb mixer blocks (i.e., the first and second parametric mixers 24 and 26) shown in FIG. 4 employed a design with two HNLF stages and one standard SMF stage. The first stage of each mixer was constructed using an HNLF that was longitudinally strained to increase the Brillouin threshold beyond that of the CW pump level of the SLs. The second state, the compression stage of each mixer was composed of standard SMF matching the frequency chirp induced in the first stage. The third state where substantial mixing generating a wide spectral comb occurs, was built using dispersion-flattened HNLF possessing small normal dispersion. This section was engineered with dispersive variation below 1 ps/nm/km over the entire comb bandwidth. The dispersion of the HNLF was controlled to maintain operation within the normal dispersion region and to suppress modulation-instability amplified noise.

Due to the different pump frequency pitch for the multicasting and LO-mixer designs in the embodiment of the RF channelizer 10 shown in FIG. 4, the fiber lengths for the first and second parametric mixers 24 and 26 were: 105 m, 6 m and 200 m, and 100 m, 15 m, and 200 m, respectively. The multicast signal copies were generated with 198.8 GHz pitch and an LO comb with 200 GHz pitch, providing a Vernier frequency walk-off of 1.2 GHz between the two combs. The subbands of the multicast signal copies and the LO-comb lines were selected and fanned out to the coherent detection array 34 by using AWGs WDMs as the first and second optical filters 30 and 32. In the back plane, a dual-channel 3.6 GSample/s 12-bit ADC was used to digitize I and Q channels and further DSP was subsequently applied offline using a computer.

Figure 5A:
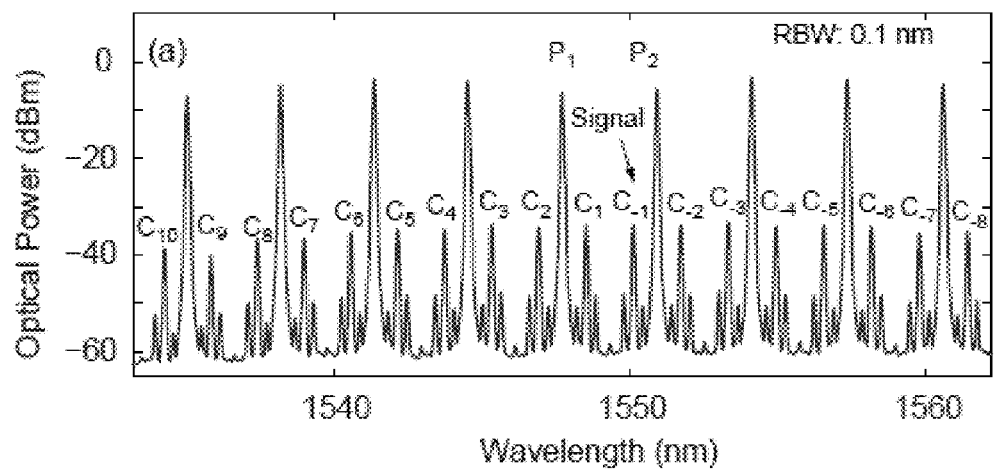
FIGS. 5a and 5b are wavelength versus power plots of the output of different parametric mixers.
Figure 5B:
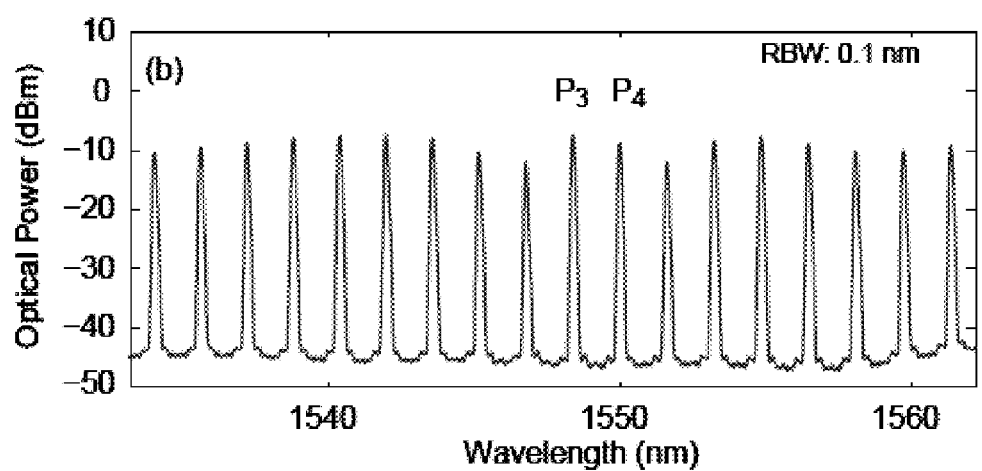

FIGS. 5a-5b are plots of the optical spectra at the output of the first parametric mixer 24 and the second parametric mixer 26 respectively of the embodiment of the RF channelizer 10 shown in FIG. 4. From the first parametric mixer 24, 18 channels (copies, denoted $C_N$) were selected having power variation within 6.5 dB, as shown in FIG. 5a. The corresponding 18 coherent LO comb lines, spanning from 192.025 to 195.425 THz, were used to create the different channelizer sub-channels with 1.2-GHz Vernier shift, as seen in FIG. 5b. Consequently, a continuous frequency channelization was achieved with a span of 21.6 GHz and input frequency range from 15.5 to 37.1 GHz. The system performance was characterized by measuring each channel individually with single and two-tone measurements and frequency sweeps.

Figure 6:
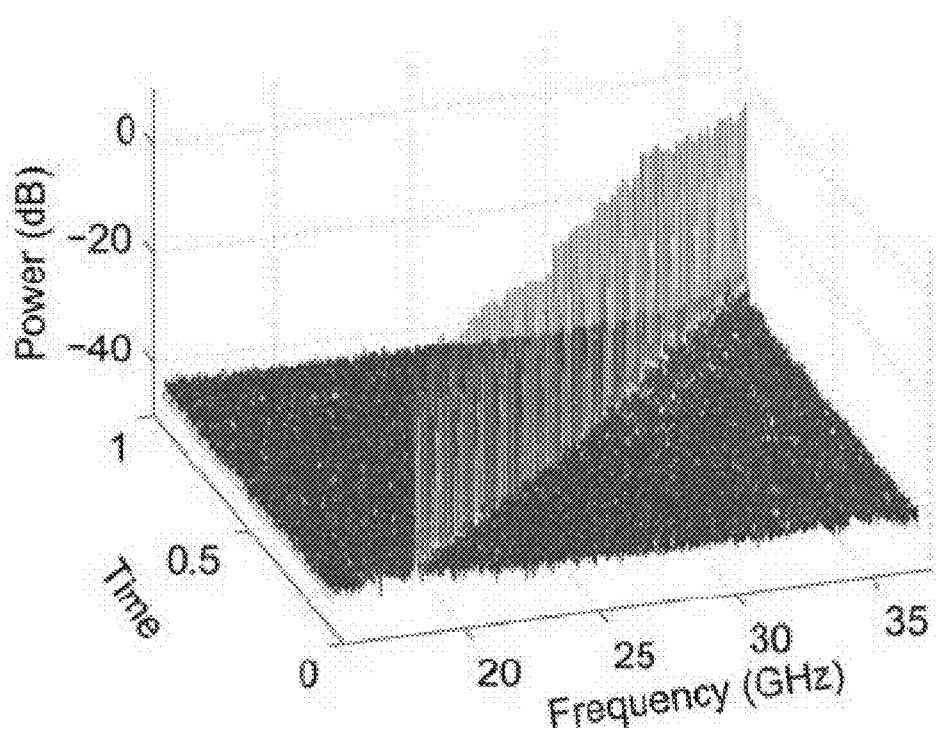
FIG. 6 is a time-frequency-power plot of the output of an embodiment of an RF channelizer.

FIG. 6 is a time-frequency plot showing the results of measuring the frequency response of the system, synthesized from measurements of each channel with the input signal repeatedly swept across the full frequency range. As seen in FIG. 6, seamless capturing of frequency sweep over all the sub-channel coverage range is achieved using a 10 MHz resolution bandwidth. During the sweep over the covered frequency range there was no strong cross-talk observed between the channels (inter channel) over the covered range. As seen in FIG. 6, there are no spurious signals larger than −45 dBc. Further analysis of the in-channels performance shows that the frequency response of this embodiment of the RF channelizer 10 has a flatness within +/−3 dB over the input signal frequency range, but improved uniformity could be achieved with additional calibration. The variation in power of individual channels was due to the different power in the comb lines, spectral response in the optical filters and frequency roll-off of the modulator.

The embodiment of the RF channelizer 10 depicted in FIG. 4 was further characterized using single tone stimuli to measure the dynamic range and sensitivity. The data was captured by varying the input power level from −95 to 20 dBm in the RF synthesizer. The power reaching the MZM 64, which was defined as the input to the system, was 3.9 dB less due to the insertion loss in a 3 dB-coupler used to combine a second signal synthesizer for subsequent two stimuli measurements, and cables.

Figure 7:
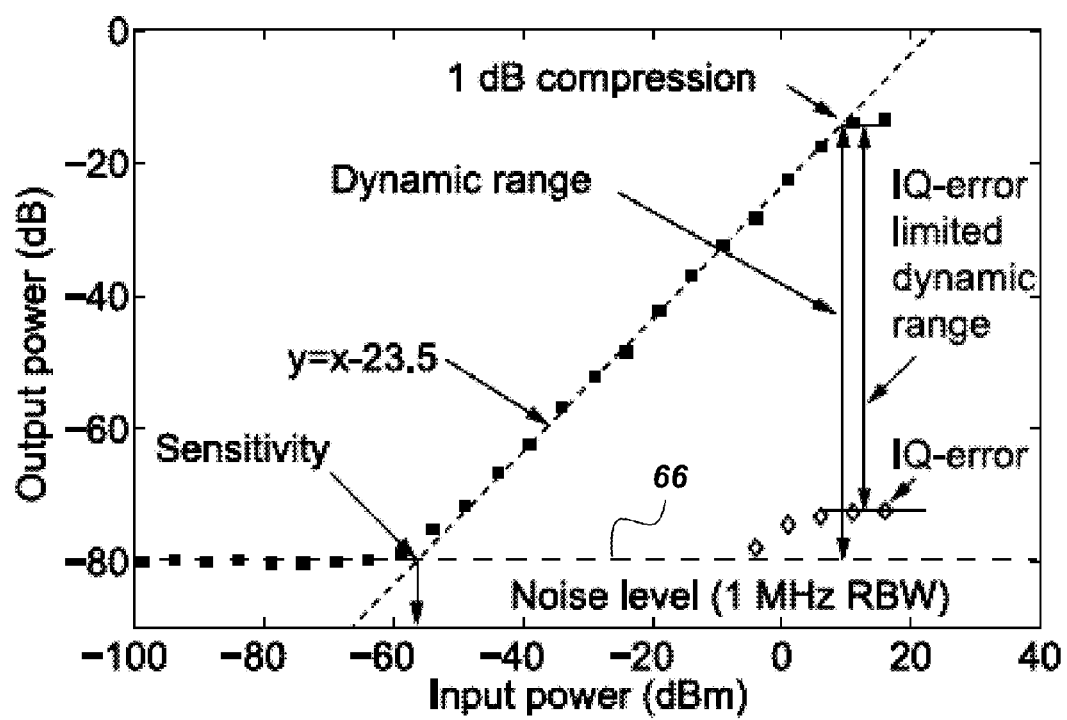
FIG. 7 is a plot showing measurement results.

FIG. 7 is a plot of the results of single tone dynamic range and RF sensitivity measurements of the second signal copy $C_2$ corresponding to the embodiment of the RF channelizer 10 shown in FIG. 4. The sensitivity was defined as power of the input signal yielding output distinguishable from the noise floor 66, as marked in FIG. 7. Furthermore, the signal-to-noise ratio (SNR)-limited dynamic range was defined as the ratio of the 1 dB compression point to noise limited sensitivity, also marked in FIG. 7. The response of the system was limited by non-linear characteristics of the MZM transfer function. The highest contribution to the nonlinearity in the receiver was not from the MZM transfer function, but caused by an IQ-error due to a non-ideal 90° optical hybrid, which is seen in the fast Fourier transform (FFT)-spectra in FIGS. 8a-8d. Therefore, the dynamic range was also limited by the spur from the IQ-error, and this contribution was characterized, as marked in FIG. 7.

Figure 8A:
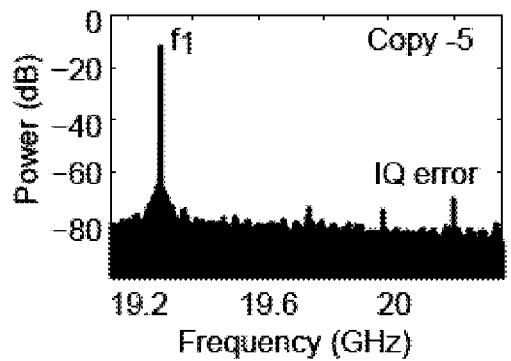
FIGS. 8a through 8d are plots of power versus frequency of several different signal copies corresponding to an embodiment of an RF channelizer.
Figure 8B:
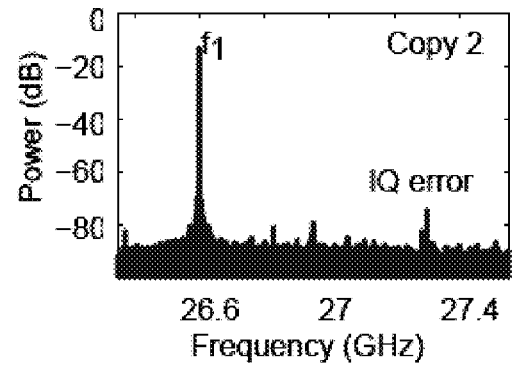
Figure 8C:
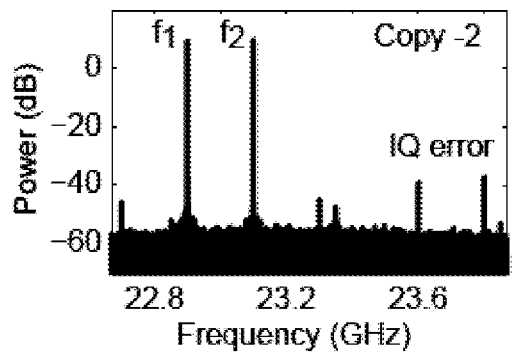
Figure 8D:
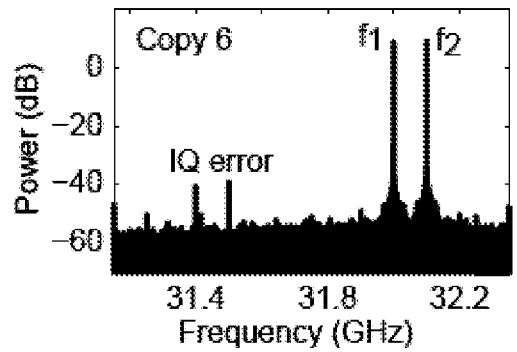

FIGS. 8a through 8d are plots of the power versus frequency of several different signal copies corresponding to the embodiment of the RF channelizer 10 shown in FIG. 4. FIG. 8a is an FFT-spectrum for signal copy $C_{-5}$. FIG. 8b is an FFT-spectrum for signal copy $C_2$. FIG. 8c is an FFT-spectrum for signal copy $C_{-2}$. FIG. 8d is an FFT-spectrum for signal copy $C_6$. The FFT-spectra of two copies, copy −5 and 2, shown in FIGS. 8a and 8b, in which an RF input sensitivity of −55 and −57 dBm and SNR-limited dynamic range of 66.8 and 64 dB.

Figure 9A:
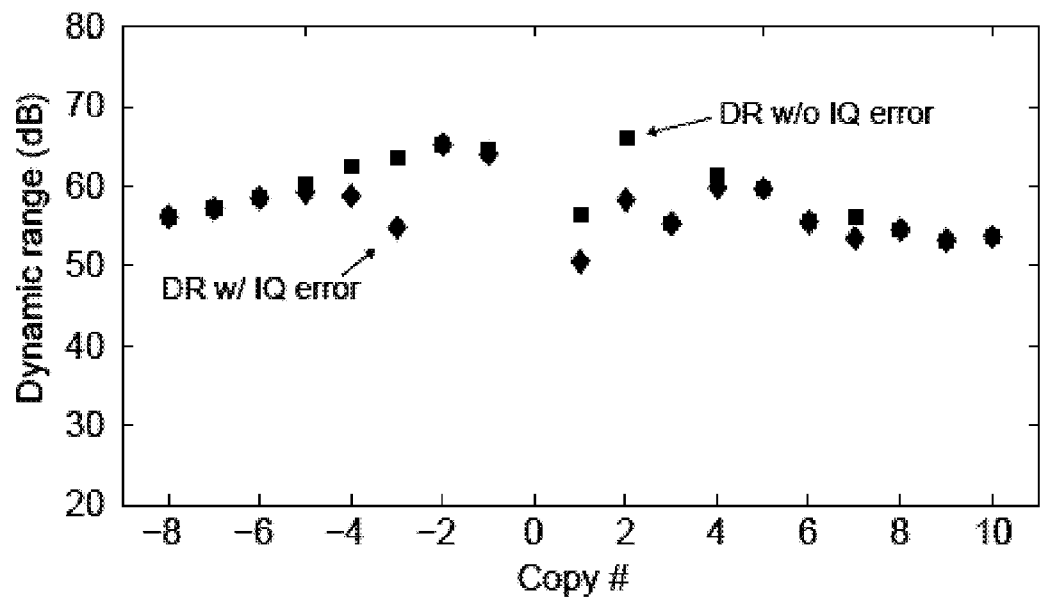
FIGS. 9a and 9b are plots showing the results of single tone stimuli for dynamic range, with and without the contribution of the IQ-error, and the sensitivity, respectively corresponding to an embodiment of the RF channelizer.
Figure 9B:
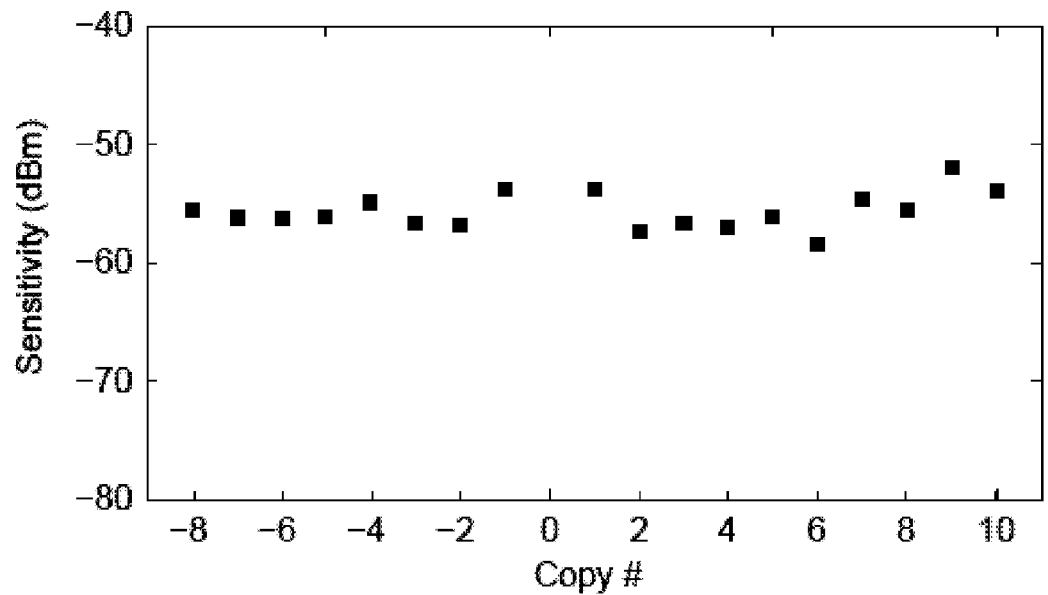

FIGS. 9a and 9b are plots showing the results of single tone stimuli for dynamic range, with and without the contribution of the IQ-error, and the sensitivity, respectively corresponding to the embodiment of the RF channelizer 10 shown in FIG. 4. The maximum dynamic range of 65 dB was recorded.

The RF input signal sensitivity of each channel is shown in FIG. 9b, where a minimum sensitivity of −58.4 dBm was recorded using a 1 MHz resolution bandwidth. Both measurements were captured with a 1 MHz resolution bandwidth. Note that the sensitivity in this embodiment was measured without a low-noise electrical amplifier (LNA) before the modulator.

The performance of the RF channelizer 10 embodiment of FIG. 4 was further investigated using two-tone stimuli, which was generated by two RF-signal synthesizers, in order to characterize the two-tone dynamic range and the third-order inter modulation (IMD3) limited spurious-free dynamic range (SFDR). The power level of the two input RF signals were increased from −20 to 12 dBm per tone, while the system response was recorded. The FFT spectra of two signal copies (ie., $C_{-2}$ and $C_6$) are shown in FIGS. 8c and 8d. Here it is seen that spurs from several sources contribute to limit the dynamic range. The strongest contribution is from the aforementioned IQ-error. The IMD3-tones cause the second strongest set of spurs.

Figure 10:
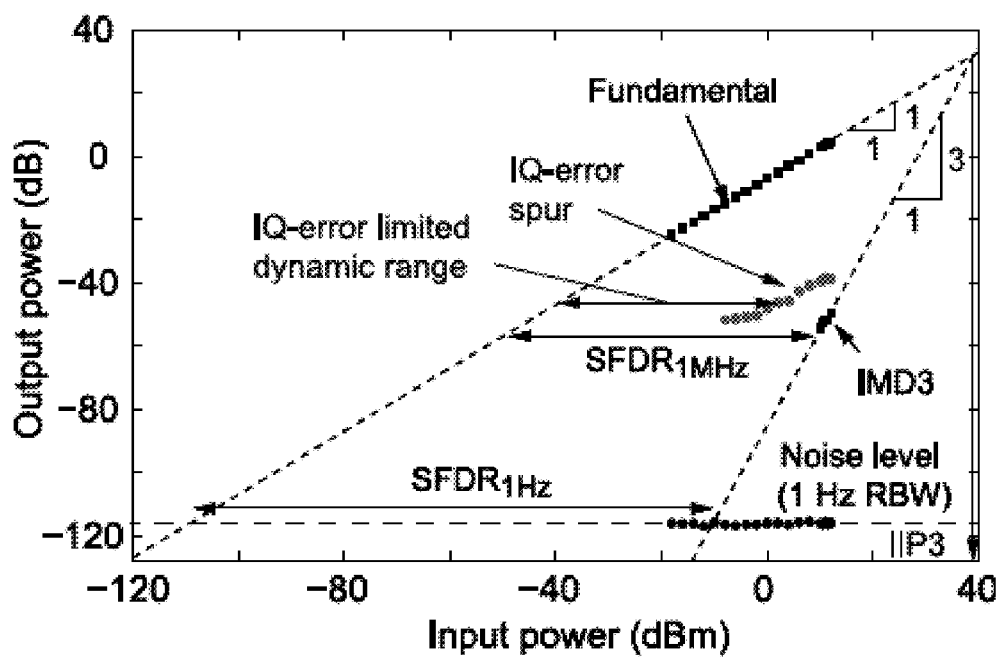
FIG. 10 is a plot showing measurement results.

FIG. 10 is a plot showing two-tone input measurement of characteristics corresponding to the signal copy $C_2$. FIG. 10 displays the power of the fundamental tones, noise, IMD3 and the strongest spur, namely the one originating from the IQ-error, which set the practical limit of the dynamic range, as marked in FIG. 10. However, as the IQ error could be significantly reduced or eliminated, it is also of interest to analyze the dynamic range limited by the IMD3.

Figure 11A:
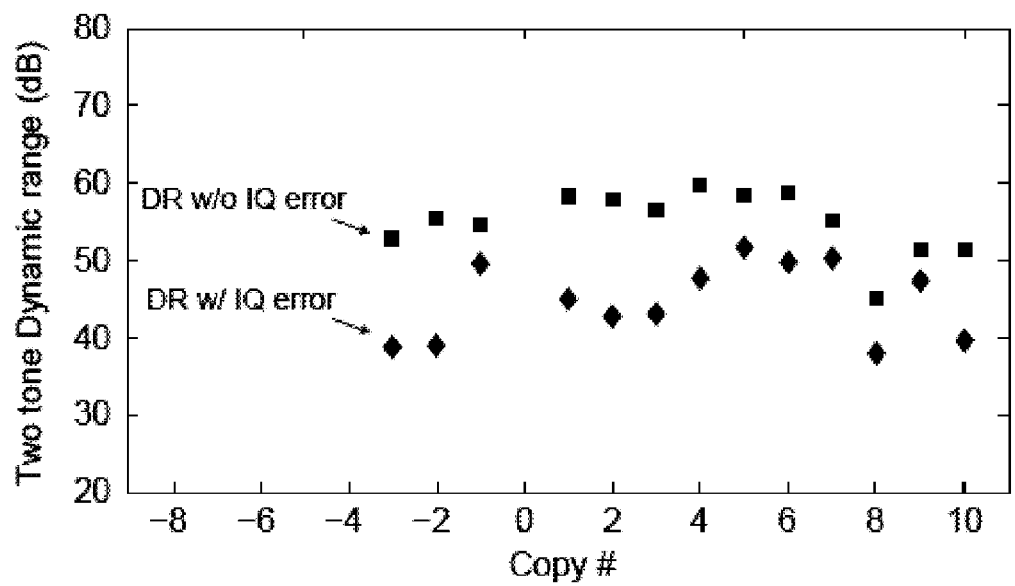
FIGS. 11a-11b are plots presenting the results of maximum dynamic range to any spur or noise for different signal copies of an embodiment of the RF channelizer.
Figure 11B:
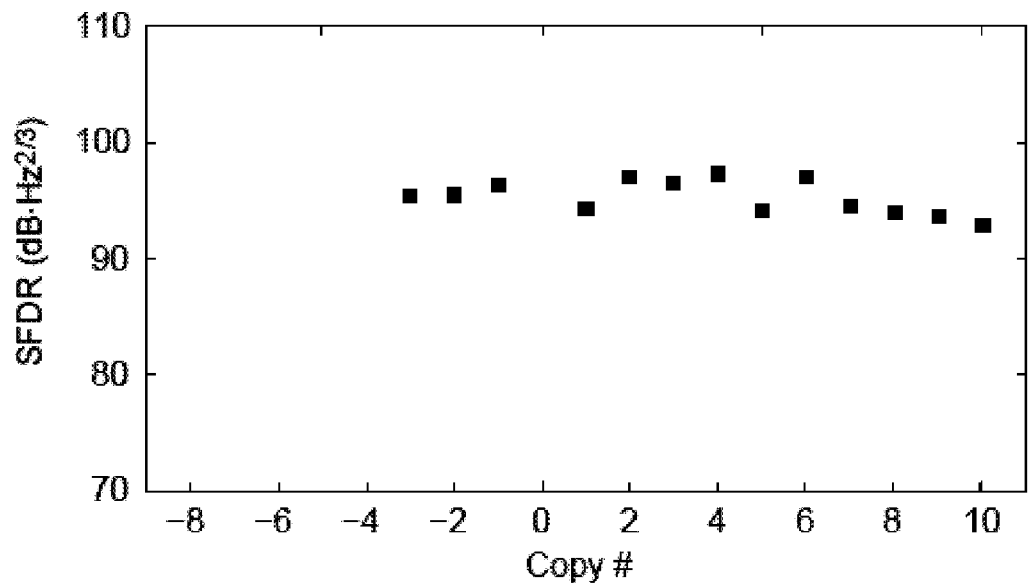

FIGS. 11a-11b are plots presenting the results of maximum dynamic range to any spur or noise for the different signal copies. Both the results with and without the dominating IQ-error spurs are presented, and it is seen that the dynamic range is significantly reduced by the IQ-error spurs. Omitting the contribution from the IQ-error, the highest dynamic range was 59.8 dB using a 1 MHz noise resolution bandwidth. Considering only the IMD3 spur contribution, assuming that the other contributions could be significantly reduced, the SFDR can be calculated as shown in FIG. 10. Linear extrapolation of the response of the fundamental and IMD3 tones, as well as the noise floor measured with 1 Hz resolution bandwidth, shows the intersects of calculated lines, and from that the SFDR 1 Hz is determined. The results of the SFDR characterization are shown in FIG. 11b. A maximum SFDR of 97.3 dB·Hz⅔ is recorded. For copies $C_{-2}$ and $C_6$ shown in FIGS. 8c and 8d, the IMD3 distortion-limited dynamic range was 95.5 and 97 dB·Hz$^{2/3}$, respectively.

The capturing range of the embodiment of the RF channelizer 10 depicted in FIG. 4 may be reconfigured by shifting the frequency offset between the multicasted copies and LO combs. This may be accomplished by reconfiguring the configurable optical filter (COF) shown in FIG. 4 (a configurable optical filter with multiple outputs) to select alternative lines from the seed comb for the signal generation. The new frequency band may be set to center around 75 GHz.

Figure 12A:
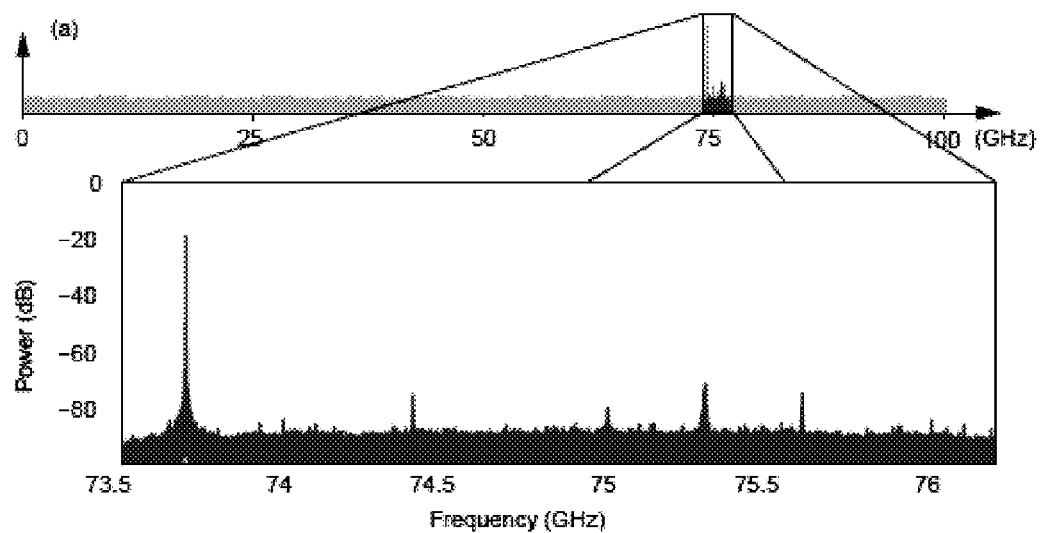
FIG. 12a is a power versus frequency plot for an embodiment of an RF channelizer.
Figure 12B:
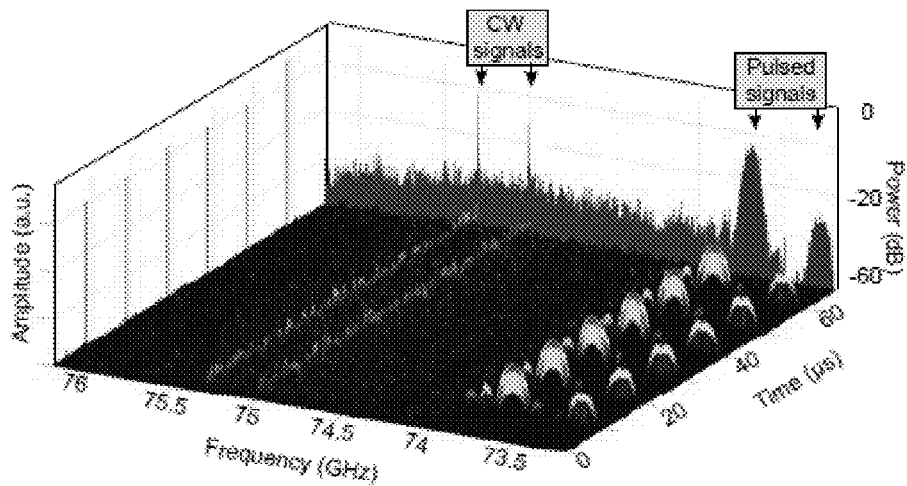
FIG. 12b is a plot of amplitude/frequency/time results for an embodiment of an RF channelizer.

FIG. 12a is a power versus frequency plot for an embodiment of an RF channelizer, which shows the ability to select a particular frequency band from a wide covered bandwidth range and capture it with a high resolution. Moreover, the channelizer implementation used in this embodiment based on coherent capturing with using ADCs in the backplane, not only allows for spectral analysis, but also real time decomposition of the signal in time. For instance spectrogram analysis can be applied to the captured signal or signals which provide additional tools for processing. This is exemplified in FIG. 12b where a full-field analysis of captured signals in time and frequency is performed using DSP. Having access to full time-domain information enables recording, demodulation and reception of captured signals.

Figure 13:
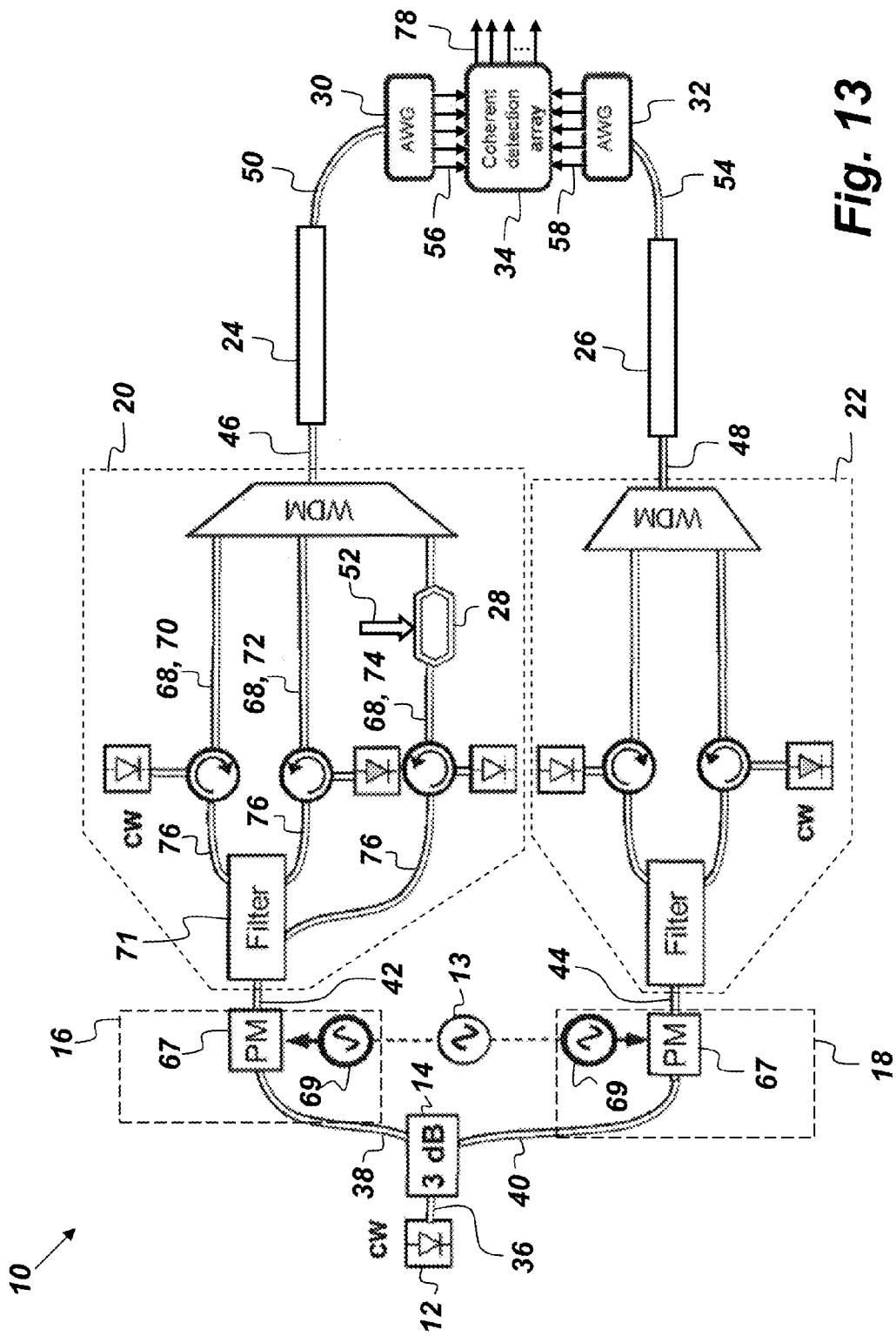
FIG. 13 is an illustration of an embodiment of an RF channelizer.

FIG. 13 is an illustration of a multicasting embodiment of the RF channelizer 10. In this embodiment, the first and second modulator modules 16 and 18 each comprise a phase modulator 67 and an RF signal source 69. By way of example the RF signal source 69 of the first modulator module 16 may be a 25 GHz RF source, and the RF signal source 69 of the second modulator module 18 may be a 25 GHz+Δf RF source—both RF signal sources 69 (i.e., from the first and second modulator modules 16 and 18) referenced to the RF reference oscillator 13.

In the multicasting embodiment of the RF channelizer 10 shown in FIG. 13, the first seed tone generator 20 comprises a filter 71 that is configured to derive from the first modulated beam 42 at least three seed beams 68. The first two beams 70 and 72 are derived with high optical power with frequency spaced by $2\Delta f_P$. A given beam 74 is derived with a frequency offset of $\Delta f_P/2$ from one of the other seed beams 68, where $\Delta f_P/2$ is equal to or a multiple of the first RF frequency. The first seed tone generator 20 may be configured to derive the three seed beams 68 by filtering the first modulated beam 42 to create three initial beams 76, and then amplifying the three initial beams 76. In the embodiment of the RF channelizer 10 depicted in FIG. 13, the signal modulator 28 is configured to modulate the received RF signal 52 onto the given seed beam 74. Signal modulator 28 may be connected via long optical fibers at its input and output so as to be located remotely from the remainder of the system. The first seed tone generator 20 may be further configured to filter and combine the first two seed beams 72 and 74 and the given seed beam 74 into the first seed tone beam 46. The first parametric mixer 16 is configured to receive and convert the first seed tone beam 46 into the first comb 50. In the embodiment depicted in FIG. 13, the first comb 50 would comprise a comb of lines spaced by $2\Delta f_P$ and multicasted copies of the RF-signal-modulated given beam 76 with spacing $\Delta f_P$ and offset in frequency by $\Delta f_P/2$ from the comb of lines spaced by $2\Delta f_P$. In the embodiment of the RF channelizer 10 shown in FIG. 13, the second seed tone generator 22 is configured to derive from the second modulated beam 44 a second seed tone beam 48 containing two (or more) second seed tones, spaced by $(\Delta f_P+\delta)/n$, where n is a positive integer and the absolute value of δ is the channel spacing (resolution bandwidth) of the channelizer, and where $(\Delta f_P+\delta)/n$ is a multiple of the second RF frequency. The second seed tone generator 22 may be configured to derive the second seed tone beam 48 with high optical power at each frequency by filtering the second modulated beam 44, amplifying the filtered second modulated beam, and filtering the filtered and amplified second modulated beam. The second parametric mixer 26 is configured to receive and convert the second seed tone beam 48 into a second comb 54 with frequency pitch $(\Delta f_P+\delta)/n$. The first optical filter 30 that receives the RF-signal-modulated first comb 50 and that separates the RF-signal-modulated first comb 50 into a plurality of first filtered beams 56, the center frequency of each first filtered beam 56 corresponding to the frequency of an individual line of the second comb 54. The second optical filter 32 that receives the second comb 54 and that separates the second comb 54 into a plurality of second filtered beams 58 each second filtered beam 58 corresponding to an individual line of the second comb 54. The coherent detection array 34 may be configured to select, combine, and detect corresponding pairs from first filtered beams 56 and the second filtered beams 58, providing at its output 78 a contiguous bank of channelized coherent I/Q down converted intermediate frequency (IF) signals, spaced in frequency by the absolute value of δ covering the bandwidth of the received RF signal 52.

Figure 14:
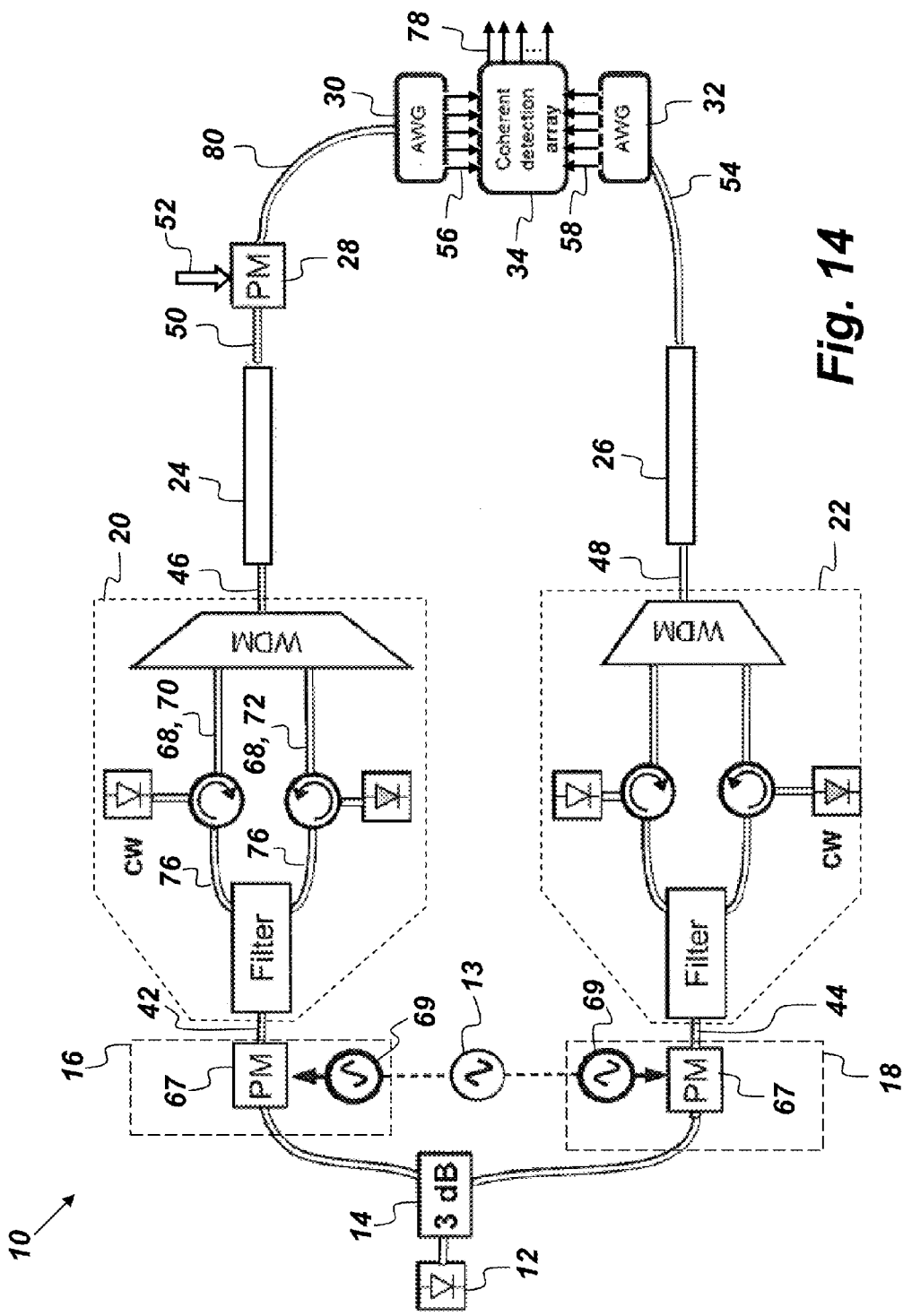
FIG. 14 is an illustration of an embodiment of an RF channelizer.

FIG. 14 is an illustration of a comb modulation embodiment of the RF channelizer 10. In this embodiment, the first and second modulator modules 16 and 18 each comprise a phase modulator 67 and an RF signal source 69 at first RF frequency and second RF frequency respectively. Both RF signal sources 69 are referenced to the RF reference oscillator 13. In this embodiment, the first seed tone generator 20 is configured to derive from the first modulated beam 42 at least two seed beams 68. The first two beams 70 and 72 may be derived with high optical power with frequency spaced by $\Delta f_P$. The first seed tone generator 20 may be configured to derive the two seed beams 68 by filtering the first modulated beam 42 to create two initial beams 76, and then amplifying the two initial beams 76. The first seed tone generator 20 may be further configured to filter and combine the first two seed beams 72 and 74 into the first seed tone beam 46. The first parametric mixer 24 is configured to receive and convert the first seed tone beam 46 into the first comb 50. In this embodiment, the first comb 50 comprises a comb of lines spaced by $\Delta f_P$. In this embodiment the signal modulator 28 is configured to modulate the received RF signal 52 to be channelized onto the first comb 50. Signal modulator 28 may be connected via long optical fibers at its input and output so as to be located remotely from the remainder of the system. In the embodiment of the RF channelizer 10 shown in FIG. 14, the second seed tone generator 22 is configured to derive from the second modulated beam 44 a second seed tone beam 48 containing two (or more) second seed tones, spaced by $(\Delta f_P+\delta)/n$, where n is a positive integer and the absolute value of δ is the channel spacing (resolution bandwidth) of the channelizer, and where $(\Delta f_P+\delta)/n$ is a multiple of the second RF frequency. The second seed tone generator 22 is configured to derive the second seed tone beam 48 with high optical power at each frequency by filtering the second modulated beam 44, amplifying the filtered second modulated beam, and filtering the filtered and amplified second modulated beam. The second parametric mixer 26 may be configured to receive and convert the second seed tone beam 48 into a second comb 54 with frequency pitch $(\Delta f_P+\delta)/n$. The first optical filter 30 receives the RF-signal-modulated first comb 80 and separates the RF-signal-modulated first comb 80 into a plurality of first filtered beams 56, the center frequency of each first filtered beam 56 corresponding to the frequency of an individual line of the second comb 54. The second optical filter 32 receives the second comb 54 and separates the second comb 54 into a plurality of second filtered beams 58 each second filtered beam 58 corresponding to an individual line of the second comb 54. The coherent detection array 34 may be configured to select, combine, and detect corresponding pairs from first filtered beams 56 and the second filtered beams 58, providing at its output 78 a contiguous bank of channelized coherent I/Q down converted intermediate frequency (IF) signals, spaced in frequency by the absolute value of δ, covering the bandwidth of the received RF signal 52.

From the above description of the RF channelizer 10, it is manifest that various techniques may be used for implementing the concepts of RF channelizer 10 without departing from the scope of the claims. The described embodiments are to be considered in all respects as illustrative and not restrictive. The method/apparatus disclosed herein may be practiced in the absence of any element that is not specifically claimed and/or disclosed herein. It should also be understood that the RF channelizer 10 is not limited to the particular embodiments described herein, but is capable of many embodiments without departing from the scope of the claims.

We claim:

1. A radio frequency (RF) channelizer comprising:
a master laser configured to generate a reference beam at a reference frequency;
a splitter configured to split the reference beam into first and second beams;
an RF reference oscillator;
a first modulator module configured to convert the first beam into a first modulated beam comprising a multitude of frequencies spaced from the reference frequency by integer multiples of a first RF frequency that is referenced to the RF reference oscillator;
a second modulator module configured to convert the second beam into a second modulated beam comprising a multitude of frequencies spaced from the reference frequency by integer multiples of a second RF frequency that is referenced to the RF reference oscillator;
a first seed tone generator configured to derive a first seed tone beam from the first modulated beam;
a second seed tone generator configured to derive a second seed tone beam from the second modulated beam;
a first parametric mixer configured to receive and convert the first seed tone beam into a first comb;
a signal modulator configured to modulate a received RF signal to be channelized onto the first comb;
a second parametric mixer configured to receive and convert the second seed tone beam into a second comb;
a first optical filter configured to receive and to separate the RF-signal-modulated first comb into a plurality of first filtered beams a center frequency of each first filtered beam corresponding to a frequency of an individual line of the second comb;
a second optical filter configured to receive and to separate the second comb into a plurality of second filtered beams each second filtered beam corresponding to an individual line of the second comb; and
a coherent detection array configured to select and down convert the received RF signal from the first and second filtered beams.

2. The RF channelizer of claim 1, wherein the first seed tone beam comprises at least two first seed frequencies spaced by $\Delta f_P$, where $\Delta f_P$ is a multiple of the first RF frequency, and wherein the second seed tone beam comprises at least two second seed frequencies spaced by $(\Delta f_P+\delta)/n$, where n is a positive integer, and the absolute value of δ is the channel spacing of the RF channelizer, and where $(\Delta f_P+\delta)/n$ is a multiple of the second RF frequency.

3. The RF channelizer of claim 2, wherein the first seed tone generator is configured to derive the first seed tone beam with high optical power at each first seed frequency by filtering the first modulated beam, amplifying the filtered first modulated beam, and filtering the filtered and amplified first modulated beam, and wherein the second seed tone generator is configured to derive the second seed tone beam with high optical power at each second seed frequency by filtering the second modulated beam, amplifying the filtered second modulated beam, and filtering the filtered and amplified second modulated beam.

4. The RF channelizer of claim 3, wherein the coherent detection array is configured to select, combine, and detect corresponding pairs from the first filtered beams and the second filtered beams, and further configured to output a contiguous bank of channelized coherent I/Q down-converted intermediate frequency (IF) signals, spaced in frequency by the absolute value of δ covering the bandwidth of the received RF signal.

5. The RF channelizer of claim 4, wherein the first and second seed tone generators each comprise;
- a cascade of optical filter stages configured to pass only desired seed tones;
- at least one optical amplifier configured to increase the power of the desired seed tones; and
- an optical multiplexer and narrow band filters configured to recombine the power-amplified desired seed tones into a single beam and to limit broadband noise produced by the at least one optical amplifier.

6. The RF channelizer of claim 4, wherein the coherent detection array comprises:
- an array of 90 degree optical hybrids;
- an array of balanced photodetectors connected to the array of 90 degree optical hybrids;
- an array of RF filters connected to the array of balanced photodetectors;
- an array of linear RF amplifiers that are connected to the array of RF filters; and
- an array of analog-to-digital converters connected to the array of RF amplifiers.

7. The RF channelizer of claim 4, wherein the coherent detection array comprises:
- an array of fiber couplers;
- an array of balanced photodetectors connected to the array of fiber couplers;
- an array of RF filters connected to the array of balanced photodetectors;
- an array of logarithmic RF amplifiers that are connected to the array of RF filters; and
- an array of analog-to-digital converters connected to the array of RF amplifiers.

8. The RF channelizer of claim 1, wherein each of the first and second parametric mixers comprises cascaded sections of heterogeneous waveguides, wherein non-linearity and dispersion properties of each waveguide section are configured to support creation of a train of high power optical pulses before a final nonlinear section, and wherein the final nonlinear section is configured to output a spectrally broad and stable optical comb.

9. The RF channelizer of claim 8, wherein first sections of the heterogeneous waveguides of the first and second parametric mixers are each a length of highly nonlinear fiber (HNLF) that is longitudinally strained such that the Brillouin threshold of the HNLF is beyond that of a continuous wave (CW) pump level of the first and second seed tone beams respectively, wherein the heterogeneous waveguides comprise compression sections, each being a standard single mode fiber (SMF) that matches a frequency chirp induced in a respective preceding waveguide section so as to produce a train of high power optical pulses, and wherein the final section is a dispersion-flattened HNLF.

10. The RF channelizer of claim 1, wherein the second comb is frequency-shifted with respect the first comb to improve the spectral efficiency of the RF channelizer.

11. The RF channelizer of claim 10, further comprising an acousto-optic modulator driven by a third RF frequency equal to $\delta/2$, wherein the second seed tone beam comprises at least two second seed tones, spaced apart by $(\Delta f_P + 2\delta)/n$ where $(\Delta f_P + 2\delta)/n$ is a multiple of the second RF frequency, wherein an output of the second seed tone generator is connected to an input of the acousto-optic modulator, and wherein a frequency-shifted output of the acousto-optic modulator is connected to an input of the second parametric mixer, such that the second comb is shifted with respect to the first comb, such that unique RF frequencies from lower and upper side bands of a comb of signal copies which have double side bands are channelized.

12. A radio frequency (RF) channelizer comprising:
- a master laser configured to generate a reference beam at a reference frequency;
- a splitter configured to split the reference beam into first and second beams;
- an RF reference oscillator;
- a first modulator module configured to convert the first beam into a first modulated beam comprising a multitude of frequencies spaced from the reference frequency by integer multiples of a first RF frequency that is referenced to the RF reference oscillator;
- a second modulator module configured to convert the second beam into a second modulated beam comprising a multitude of frequencies spaced from the reference frequency by integer multiples of a second RF frequency that is referenced to the RF reference oscillator;
- a first seed tone generator configured to derive at least three seed beams from the first modulated beam, at least two seed beams with high optical power with frequency spaced by $2\Delta f_P$ and a given seed beam with frequency offset by $\Delta f_P/2$ from one of the other seed beams, where $\Delta f_P/2$ is equal to or a multiple of the first RF frequency;
- a signal modulator configured to modulate a received RF signal to be channelized onto the given seed beam, wherein the first seed tone generator is further configured to filter and combine the at least three seed beams into a single first seed tone beam;
- a first parametric mixer configured to receive and convert the first seed tone beam into a first comb comprising a comb of lines spaced by $2\Delta f_P$ and multicasted copies of the modulated given seed beam with spacing $\Delta f_P$ and offset in frequency by $\Delta f_P/2$ from the comb of lines spaced by $2\Delta f_P$;
- a second seed tone generator configured to derive from the second modulated beam a second seed tone beam comprising at least two second seed tones, spaced by $(\Delta f_P + \delta)/n$, where n is a positive integer and the absolute value of $\delta$ is the channel spacing, or resolution bandwith, of the channelizer, and where $(\Delta f_P + \delta)/n$ is a multiple of the second RF frequency;
- a second parametric mixer configured to receive and convert the second seed tone beam into a second comb with frequency pitch $(\Delta f_P + \delta)/n$;
- a first optical filter configured to receive and separate the first comb into a plurality of first filtered beams, the center frequency of each first filtered beam corresponding to a frequency of an individual line of the second comb;
- a second optical filter configured to receive and separate the second comb into a plurality of second filtered beams, each second filtered beam corresponding to an individual line of the second comb; and
- a coherent detection array configured to select, combine, and detect corresponding pairs from the first filtered beams and the second filtered beams, and further configured to provide as an output a contiguous bank of channelized coherent I/Q down-converted intermediate frequency (IF) signals, spaced in frequency by the absolute value of $\delta$ covering the bandwidth of the received RF signal.

13. The RF channelizer of claim 12, wherein the first seed tone generator is configured to derive the three seed beams by filtering the first modulated beam to provide three filtered beams, and then amplifying the three filtered beams to produce the three seed beams.

14. The RF channelizer of claim 13, wherein a second seed tone generator is configured to derive the second seed tone beam with high optical power at each frequency by filtering the second modulated beam, amplifying the filtered second modulated beam, and filtering the filtered and amplified second modulated beam.

15. A method for channelizing a received radio frequency (RF) signal comprising the following steps:
   generating a reference beam having a reference frequency;
   splitting the reference beam into first and second beams;
   converting the first beam into a first modulated beam comprising a multitude of frequencies spaced from the reference frequency by integer multiples of a first RF frequency that is referenced to an RF reference oscillator;
   converting the second beam into a second modulated beam comprising a multitude of frequencies spaced from the reference frequency by integer multiples of a second RF frequency that is referenced to the RF reference oscillator;
   deriving a first seed tone beam comprising at least two seed frequencies spaced by $\Delta f_P$, where $\Delta f_P$ is a multiple of the first RF frequency, from the first modulated beam;
   deriving a second seed tone beam comprising at least two seed frequencies spaced by $(\Delta f_P+\delta)/n$ where $(\Delta f_P+\delta)/n$ is a multiple of the second RF frequency, from the second modulated beam;
   converting the first seed tone beam into a first comb with a first parametric mixer;
   modulating a received RF signal onto the first comb;
   converting the second seed tone beam into a second comb with a second parametric mixer;
   separating the first comb into a plurality of first filtered beams, the center frequency of each first filtered beam corresponding to the frequency of an individual line of the second comb;
   separating the second comb into a plurality of second filtered beams each second filtered beam corresponding to an individual line of the second comb; and
   selecting, combining, and detecting corresponding pairs from first filtered beams and the second filtered beams, and providing at the output of a coherent detection array a contiguous bank of channelized coherent I/Q down-converted intermediate frequency (IF) signals, spaced in frequency by the absolute value of δ covering the bandwidth of the received RF signal.

16. The method of claim 15, wherein the step of converting the first beam into a first modulated beam is performed by coupling the first beam to a cascade of at least one modulator selected from the group consisting of electro optic phase modulators and intensity modulators, and wherein each of the at least one modulator is driven by a delayed RF drive signal referenced to the RF reference oscillator.

17. The method of claim 16, wherein the step of converting the second beam into a second modulated beam is performed by coupling the second beam to a cascade of at least one modulator selected from the group consisting of electro optic phase modulators and intensity modulators, and wherein each of the at least one modulator is driven by an RF drive signal referenced to the RF reference oscillator.

18. The method of claim 17, wherein the steps of deriving the first and second seed tone beams are performed by seed tone generators which each comprise:
   a cascade of optical filter stages configured to pass only desired seed tones;
   an optical amplifier configured to increase the power of the desired seed tones; and
   an optical multiplexer and narrow band filters configured to recombine multiplexed desired seed tones into a single beam and to limit broadband noise produced by the optical amplifier.

19. The method of claim 18, wherein the coherent detection array comprises: an array of 90 degree optical hybrids;
   an array of balanced photodetectors connected to the array of 90 degree optical hybrids;
   an array of RF filters connected to the array of balanced photodetectors;
   an array of linear RF amplifiers that are connected to the array of RF filters; and
   an array of analog-to-digital converters connected to the array of RF amplifiers.

20. The method of claim 18, wherein the coherent detection array comprises:
   an array of fiber couplers;
   an array of balanced photodetectors connected to the array of fiber couplers;
   an array of RF filters connected to the array of balanced photodetectors;
   an array of logarithmic RF amplifiers that are connected to the array of RF filters; and
   an array of analog-to-digital converters connected to the array of RF amplifiers.

* * * * *